United States Patent [19]
Wagner

[11] 3,784,356
[45] Jan. 8, 1974

[54] CELLULOSIC FLAME RETARDANT SYSTEM

[75] Inventor: George M. Wagner, Lewiston, N.Y.

[73] Assignee: Hooker Chemical Corporation, Niagara Falls, N.Y.

[22] Filed: Nov. 10, 1971

[21] Appl. No.: 197,479

[52] U.S. Cl. ............ 8/196, 8/116 P, 8/120, 8/181, 117/62.2, 117/136
[51] Int. Cl. .......................... D06m 13/44
[58] Field of Search .......... 8/116.2, 116 P, 181, 8/196; 117/136, 62.2

[56] References Cited
UNITED STATES PATENTS

| | | | |
|---|---|---|---|
| 2,983,623 | 5/1961 | Coates | 117/62.2 |
| 3,276,897 | 10/1956 | Reeves et al. | 117/136 |
| 3,404,022 | 10/1968 | Chance et al. | 117/136 X |
| 3,247,015 | 4/1966 | Zimmerman et al. | 117/136 X |
| 2,772,188 | 11/1956 | Reeves et al. | 117/136 |
| 3,236,676 | 2/1966 | Coates et al. | 117/62.2 |

Primary Examiner—Herbert B. Guynn
Attorney—Peter F. Casella et al.

[57] ABSTRACT

A process for imparting flame retardant character to cellulosic containing materials has been devised in which the cellulosic material is treated with an aqueous solution of further polymerizable methylol-phosphorus compound obtained by reacting a tetrakis-(hydroxymethyl)phosphonium acid salt e.g., tetrakis(-hydroxymethyl)phosphonium chloride with about 0.5 to 1.5 mol proportion of ammonia, in the presence of a carbamic acid derivative, e.g., urea, and the treated material is contacted with an aqueous solution of ammonia thereby curing the methylol-phosphorus-compound in and on the cellulosic material.

11 Claims, No Drawings

CELLULOSIC FLAME RETARDANT SYSTEM

This invention relates to a process for producing flame retardant cellulosic containing materials. More particularly it relates to a process of incorporating a phosphorus containing polymer in and on cellulosic containing materials.

BACKGROUND OF THE INVENTION

The treatment of cellulosic containing materials to impart flame retardant character thereto has been the subject of considerable effort and many such processes have been proposed. However, most if not all such processes have defects which militate against their complete acceptance by those working in this area.

It is known, according to U.S. Pat. No. 2,772,188 to utilize an aqueous solution of a further polymerizable methylol-phosphorus compound to treat a cellulosic containing material, and after drying the treated material, to react the methylol-phosphorus compound with ammonia, in gaseous or dissolved state to insolubilize the methylol-phosphorus compound on the material.

U.S. Pat. No. 2,983,623 discloses an improvement in the aforementioned process whereby the dried cellulose material impregnated with the methylol-phosphorus compound is given an initial treatment with gaseous ammonia and thereafter treated with aqueous ammonia.

In U.S. Pat. No. 3,096,201 it is shown that by including a substantial amount of diammonium sulfite in the methylol-phosphorus compound solution, the gaseous ammonia treatment of the dried impregnated cellulose material is rendered unnecessary.

According to U.S. Pat. No. 3,236,676, a cellulosic material is treated with an aqueous solution of a phosphonium compound, the material is dried and then heated at 100° to 180° C. to fix the phosphonium compound on the material. The thus treated material is exposed to gaseous ammonia and then treated with aqueous ammonium hydroxide to cure the phosphonium compound on the cellulosic material.

All these prior art processes have not been completely satisfactory for one or more reasons. For example, in many instances it has been observed that the phosphonium compound has a tendency to migrate to the surface of the material during the aqueous ammonia treatment and thus does not become permanently fixed to the fiber. During this aqueous treatment a considerable portion of the phosphonium compound is leached from the material or is polymerized on the surface of said material. It is known also that the reaction of gaseous ammonia with the phosphonium compound is limited by the rate of diffusion of the ammonia through the fabric which at times may be very low and in some instances the impregnated material must be maintained for long periods in the ammonia atmosphere in order to obtain a fully reacted product. Moreover, the reaction being exothermic in character, the temperature of the cellulosic material in some instances may get undesirably high. Also, the heating of the dried material to fix the phosphonium compound on the material is an additional processing step requiring the expenditure of time and capital and often results in the tendering or otherwise depreciating the physical character of the treated cellulosic materials.

It can therefore be seen that the prior art methods proposed for the application of phosphonium compounds to cellulosic materials leaves something to be desired.

OBJECTS OF THE INVENTION

It is therefore a principal object of this invention to devise a process for imparting flame retardancy to cellulose containing materials which does not involve a step of treating the material with gaseous ammonia.

Another object is to devise a simple, effective, and economical process for treating cellulose containing materials with aqueous solutions of phosphonium compounds to render such materials flame retardant.

Other objects will be obvious from the following description of this invention.

BRIEF DESCRIPTION OF THE INVENTION

In accordance with the present invention, cellulose containing materials are treated with an aqueous solution of a further polymerizable methylol-phosphorus compound, e.g., tetrakis(hydroxymethyl)-phosphonium chloride, which has been reacted with about 0.5 – 1.5 molar proportion of ammonia in the presence of at least about 0.25 mole of carbamic acid derivative to form a water soluble reaction product, and the treated material, preferably after being partially dried, is contacted with a dilute aqueous solution of ammonia to cure the methylol-phosphorus compound in and on the cellulose containing material.

By this process, the steps of fixing the methylol-phosphorus compound on the material, and treatment of the impregnated material with gaseous ammonia and with heat are avoided.

The process of the present invention is adaptable to the treatment of cellulose containing materials such as cotton, regenerated cellulose, mixtures of these materials with synthetic materials such as polyester-cotton blends, wood, paper, and the like.

DETAILED DESCRIPTION OF THE INVENTION

In accordance with a preferred mode of carrying out the process of the present invention, an aqueous solution of a tetrakis-(hydroxymethyl)phosphonium acid salt is reacted with from about 0.5 to about 1.5 molar proportions of ammonia in the presence of from about 0.25 to about 2 molar proportions of urea, while maintaining the pH of the solution below about 3. The resulting solution is adjusted to a pH within the range of about 4 to 7 and preferably from about 5 to 6 by the addition of an alkaline agent, such as sodium hydroxide, triethanolamine and the like. Thereafter, the solution is padded onto a cellulosic containing material and the thus treated material is preferably dried to at least about a 50 percent moisture retention. This drying step is effected at a relatively moderate temperature, such that no substantial fixation of the phosphonium compound on the material occurs. The dried material is thereafter contacted with, e.g., padded with, a dilute aqueous ammonium hydroxide solution to cure the phosphonium compound on and in the material. The material is scoured in an aqueous alkaline bath containing a oxidizing agent, e.g., sodium peroxide, hydrogen peroxide, and the like, and the scoured material is rinsed and dried.

The resultant material is flame retardant and can be washed numerous times with soap/soda ash solutions at the boil without substantial loss of flame retardant character. Substantially no leaching or migration of the phosphonium compound occurs during the curing step.

Various acid salts of the tetrakis(hydroxymethyl)-phosphonium compound are suitable for use in this invention. Exemplary of such salts are the chloride, bromide, sulfate, phosphate, acetate, and propionate. The chloride, because of its general availability and overall effectiveness is the preferred salt.

Any of the further-polymerizable methylolphosphorus materials referred to in the aforementioned U.S. Pat. No. 2,772,188 are suitable for use in the process of this invention. A particularly useful and hence preferred material is tetrakis(hydroxymethyl)-phosphonium acid salt and especially, the chloride. This salt reacts with limited amounts of ammonia to give a reaction product which is soluble and which is probably a mixture of the mono-functional and bifunctional derivatives. As is known, when an excess of ammonia is used the phosphonium compound reacts to give a trifunctional cross linked polymeric reaction product which is insoluble in water. However lesser amounts, i.e., amounts within the range of about 0.5 to about 1.5 mols per mol of phosphonium compound result in reaction products which are water soluble and probably comprise essentially mixtures of the mono- and di-functional derivatives. Further additions of ammonia to this reaction product result in the formation of the insoluble, trifunctional cross linked polymer.

Carbamic acid derivatives which can be used in preparing the further polymerizable phosphonium salt-ammonia reaction product include by way of example urea, thiourea, biuret, guanidene, cyanamide, dicyanamide, ethyleneurea, and the like. Of these, urea and thiourea are preferred. It is believed that the product formed by reaction of the phosphonium salt and ammonia in the presence of the carbamic acid derivative is a relatively stable, soluble complex which is decomposed during the drying and/or curing steps liberating the carbamic acid derivative. The carbamic acid derivative is leached out of the impregnated material and thus does not remain, to any substantial amount, affixed to the treated material.

The amount of carbamic acid derivative used can be varied over a considerable range. Preferably this compound should be present in the amount of at least about 0.25 mole per mole of the phosphonium compound. Generally, it has been found that amounts of the carbamic acid derivative as great as 5.0 to 10.0 moles or more may be used, although amounts appreciably in excess of about two moles per mole of the phosphonium salt do not materially improve the results and hence for this reason are not generally used.

Generally the pH of the aqueous solution of the reaction product of the phosphonium compound and ammonia is adjusted to within the range of about 4 to 7 and preferably within the range of about 5 to 6 prior to use although pH values outside of these limits can be used. As is known, strongly acidic media, i.e., media having a pH value below about 1 may degrade cellulosic materials, while strongly alkaline media, i.e., media having pH values above about 8 may result in undesirable decomposition of the phosphonium compound.

The pH of the aqueous solution can be adjusted to within the desired range by the use of alkaline agents such as sodium or potassium hydroxides, sodium acetate, water soluble tertiary amines such as triethanolamine, tributyl amine, trihexylamine, triisopropanol amine, tripentanolamine and the like. Of these alkaline agents, triethanolamine is preferred, and primary reference will be made hereinafter to this material.

The aqueous solution can be applied to the cellulosic containing material by conventional means such as by dipping, spraying, padding, and the like. The treated material can be passed through nip or squeeze rolls to adjust the pickup of the solution to about 100 percent on the weight of the material.

The drying of the impregnated material should be carried out under relatively mild conditions, e.g., at temperatures of about 120 degrees centigrade. Higher temperatures e.g., up to about 175 to 200 degrees centigrade can be used, but care should be exercized that the material is not heated in the dried condition to fix to any substantial degree the resin on the material, for under such excess conditions of temperature/time it has been found that the resinous materials have a pronounced tendency to migrate to the surface of the material and produce superficial resin coatings which are less fast to subsequent treatments, such as washing, and produce unattractive spottiness on the material.

This drying operation is not considered essential to the process of the present invention. However, it has been observed that some leaching of the phosphonium salt-ammonia reaction product occurs when the material is not dried. Thus it is preferred that the treated material be dried to the extent of at least the removal of about 50 percent by weight of its moisture content prior to curing. That is to say, it is preferred that the treated material be dried, under moderate conditions, to a moisture retention of 50 percent by weight or less.

Following this optional drying operation the treated cellulosic material is subjected to a chemical curing operation, using a source ammonia. The ammonia may be supplied for this curing operation as aqueous ammonia, including ammonium hydroxide, solutions of amino compounds containing at least two reactive hydrogen atoms per molecule, such as amines containing a primary amino group, hydrazine, alkyl substituted hydrazines, and the like, ammonium carbonate, or other readily dissociated weak acid salts of ammonia, such as ammonium acetate, ammonium formate, and the like. Additionally, as disclosed in U.S. Pat. No. 3,310,419, the chemical cure of the treated cellulosic containing material can be effected using a composition comprising a mixture of the ammonium salt of a strong acid, such as ammonium sulfate, an alkali metal carbonate, such as sodium carbonate, and an alkali metal bicarbonate, such as sodium bicarbonate. An aqueous solution of such a mixture is prepared and the treated cellulosic containing material is contacted therewith.

For ease of operation, it is generally preferred to effect the chemical cure of the polymerizable composition with aqueous solutions of ammonia, containing about 3 to 10 percent ammonia. The chemical cure is carried out for a period of time sufficient to effect substantially complete curing of the polymerizable composition in and on the material with the resulting substantially complete water insolubilization of the composition in and on the cellulosic material. While it is obvious that the exact time required for the chemical curing will vary, depending upon the amount of resin add-on to be obtained in and on the treated material, as well as the nature of the cellulosic material itself, chemical curing times of about one to about 5 minutes have been found to be typical.

As with the treating and drying steps, the chemical curing operation may also be carried out in either mill apparatus or commercial laundry apparatus, depending upon the nature of the cellulosic material being treated. Where yard goods are being treated, this curing operation can be accomplished in a padder or on a jig. In mill set-ups, where the padder is arranged in tandem relationship with the dryer, the chemical curing step can be carried out continuously. Where, however, the finishing operations are to include a scouring in a jig, the ammonia cure is more conveniently carried out in jig during the first end.

Th following examples will illustrate the process of the present invention. Parts and percentages are by weight and temperatures in degrees centigrade, unless otherwise specified.

Flame retardancies reported were determined in accordance with the procedure of the American Association of Textile Chemists and Colorists, Test AATCC Base 34-1969. Tensile strengths were determined in accordance with the procedure of Federal Specification CCCT-1916, 5100, and the stiffness of the fabric using a Gurley stiffness tester.

EXAMPLE 1

A solution of 500 parts of tetrakis(hydroxymethyl)-phosphonium chloride (80 percent = 2.1 mols), and 60 parts of urea (1.0 mol) in 315 parts of water was prepared The solution was agitated vigorously as 125 parts of 28 percent ammonium hydroxide (2.06 mols $NH_3$) were added dropwise in thirty minutes. The temperature of the mass rose to about 74 degrees and the pH was 2. The mixture was permitted to stand at ambient temperature for about 24 hours, during which period the pH decreased to about 1.0.

Triethanolamine, 10 parts, was added to 100 parts of the above prepared solution to adjust the pH thereof to 5.0. The resulting solution was used to pad a bleached cotton poplin, 5.5 oz per sq. yd. The materials was run through squeeze rolls to adjust the wet pick-up to about 100 percent. The treated material was dried for two minutes at about 120 degrees and then run through a 3 percent aqueous ammonium hydroxide padding bath. The material was then scoured in an aqueous alkaline soap solution containing 5 percent of 35 percent hydrogen peroxide to remove excess chemicals, water-rinsed and the scoured material dried and conditioned at 21° and 65% RH. The dried fabric was found to have increased in weight by 18.9 percent compared to the original material. The treated material possessed excellent resistance to burning when tested by the conventional vertical strip flame test. This property was not impaired after subjecting the fabric to nine successive one hour boiling washes in a solution of 90 parts soap, 90 parts of soda ash, 10 parts of a synthetic anionic detergent in about 50,000 parts of water.

EXAMPLE 2

This example illustrates the effect of varying the amount of resin add-on on the permanance of the flame retardant character of the treated material.

An aqueous solution containing the reaction product of one mol proportion of tetrakis(hydroxymethyl)phosphonium chloride, (THPC) 0.8 mol proportion of ammonia and 0.5 mol proportion of urea, was prepared as described in Example 1 above. Sample of 5.5 oz cotton poplin were treated with this solution and thereafter the fabric was passed between squeeze rolls to obtain various levels of wet resin add-on. The treated samples were each dried for three minutes in a 120 degree oven, cured by running through a three percent aqueous ammonia padding bath, scoured, rinsed and dried and conditioned at 21 degrees and 65 percent relative humidity. The treated samples were weighed to determine the amount of resin add-on and then tested for flame retardance, initially and after 5 and after 9 boil cycles as in Example 1. The tensile strength and stiffness were determined using the procedures as have been indicated herein above. The results obtained are set out in the following Table.

TABLE I

| | | | | | |
|---|---|---|---|---|---|
| % Reaction product on fabric — wet[1] | 25 | 30 | 35 | 40 | 45 |
| % Reaction product after scour — dry | 11 | 14 | 16 | 18 | 22 |
| Char length initial — inches | 5.1 | 3.8 | 3.8 | 4.5 | 3.8 |
| Char length after 5 cycles | B[2] | 5.3 | 4.0 | 4.9 | 4.8 |
| Char length after 9 cycles | B | B | 5.9 | 4.5 | 4.8 |
| Tensile grab, fill (lbs/in.)[3] | 30 | 31 | 35 | 35 | 35 |
| Tensile grab, warp (lbs/in.) | 53 | 60 | 60 | 63 | 58 |
| Stiffness Warp (milligrams) | 20 | 39 | 28 | 48 | 32 |

LEGEND:
[1] Based on THPC originally present in reaction mixture.
[2] "B" indicates that the sample burns.
[3] Tensile Strength of untreated material, fill 32 lbs/in. warp 55 lbs/in.

These results indicate that whereas all the treated samples initially were rendered flame retardant, permanent flame retardance was obtained only after about 15 percent or more of the resin was added on the fabric. Moreover these data indicate that the treatment does not noticeably affect either the tensile strength or stiffness of the fabric.

EXAMPLE 3

The importance of the presence of the carbamic acid derivative in the aqueous solution of the reaction product is illustrated by the following series of tests.

Aqueous solutions of the reaction product of one mol proportion of tetrakis(hydroxymethyl)phosphonium chloride and 0.8 mol proportion of ammonia were prepared in the absence of, and in the presence of various molar proportions of urea, as described in Example 1 above. Samples of 5.5 oz bleached cotton poplin material were treated with this solution to a wet pick-up of 45 percent reaction product, the samples dried at about 120 degrees for three minutes, cured with three percent aqueous ammonia, scoured, and conditioned as described in Example 2 above. The samples were then tested for flame retardance and the results as set out in the following Table II.

TABLE II

| | | | | | |
|---|---|---|---|---|---|
| Mols urea/mol THPC | 0.0 | 0.125 | 0.25 | 0.375 | 0.50 |
| Percent reaction product after scour | 6.5 | 5.7 | 12.4 | 17.4 | 20.2 |
| Leaching [1] | Yes | Yes | Yes | None | None |
| Char length initial (in.) | [2]B | B | 5.8 | 3.9 | 4.0 |
| Char length after 5 boil cycles (in.) | B | B | B | 5.3 | 4.8 |
| Char length after 9 boil cycles (in.) | B | B | B | 5.5 | 4.9 |

[1] Leaching is evidence by appearance of white polymer particles either on cloth or in ammonia curing bath.
[2] "B" indicates sample burns.

EXAMPLE 4

The effect of various amounts of ammonia used to form the reaction product of this invention is illustrated by the following.

One mol proportion of tetrakis(hydroxymethyl)phosphonium chloride was reacted in the presence of 0.5 mol proportion of urea, with various mol proportions of ammonia as described in Example 1 above.

The resulting aqueous solutions were used to treated cotton poplin and the treated cloth processed as described in the above Example 1. The results obtained are set out in Table III below.

TABLE III

| Mols $NH_3$/Mol THPC | 1.0 | 0.8 | 0.6 |
|---|---|---|---|
| % Reaction product on fiber — wet | 45 | 45 | 45 |
| % Reaction product on scoured fiber | 17.8 | 19.5 | 15.0 |
| Leaching | None | None | Slight |
| Char length initial (in) | 4.6 | 5.0 | 6.0 |
| After 5 boil cycles (in) | 4.9 | 4.5 | 4.6 |
| After 9 boil cycles (in) | 7.0 | 4.6 | B |

From the above results it can be seen that as the proportion of ammonia used decreases below about 0.5 mol per mol of phosphonium salt, the reaction product becomes ineffective as an agent to impart fire retardance both with respect to leaching from the fabric and to permanance of the flame retardant character of the treated cellulosic material.

EXAMPLE 5

This example illustrates the effect of drying of the treated cellulosic material.

An aqueous solution of a reaction product of one mol proportion of tetrakis(hydroxymethyl)phosphonium chloride, 0.8 mol proportion of ammonia and 0.5 mol proportion of urea was prepared as described in Example 1 above. Samples of cotton poplin were treated with this solution and the treated material passes through squeeze rolls adjust the wet pick-up to about 100 percent of the solution on the weight of the fabric. The wet cloth was then dried for various times in a 120 degree oven to obtain cloth samples with various amounts of retained moisture. The dried cloth was then cured by immersion in dilute aqueous ammonia, scoured and conditioned as described in Example 1 above. The several treated cloth samples were evaluated for flame retardance and the data obtained is set out in the following Table V.

TABLE V

| Moisture retention | 100% (not dried) | 75% | 50% | 25% |
|---|---|---|---|---|
| % Reaction product on scoured sample | 20.6 | 20.6 | 21.5 | 22.3 |
| Leaching | slight | slight | None | None |
| Char length initial (in) | 4.1 | 3.9 | 3.9 | 3.8 |
| After 5 boil cycles (in) | 5.3 | 5.1 | 4.8 | 4.1 |
| After 9 boil cycles (in) | 6.0 | B | 7.0 | 4.9 |
| Gurley stiffness (mg) | 33 | 39 | 40 | 47 |

These results indicate that the undried or only slightly dried treated material (75 percent moisture retention) gives some leaching of the phosphorous containing resin material in the curing bath, and though initially flame retardant, this characteristic is not consistently permanent. Durable flame-retardancy is obtained when the treated fabric is dried to about a 50 percent or less moisture retention.

The invention has been described in specific terms and the best mode for carrying it out has been indicated. It will be apparent to those skilled in this art that numerous variations of these details can be made without departing from the spirit of the invention and that such variations are to be included within the scope of the invention.

What is claimed is:

1. The process for preparing flame retardant cellulosic containing materials which comprises the steps of treating a cellulosic containing material with an aqueous solution of a further polymerizable methylol phosphorus compound obtained by reacting a tetrakis (hydroxymethyl)phosphonium acid salt with from about 0.5 to about 1.5 mol proportion of ammonia in said aqueous solution in the presence of at least about 0.25 mol proportion of a carbamic acid derivative selected from the group consisting of urea, thiourea, biuret, guanidine, cyanamide, dicyanamide and ethyleneurea and adjusting the pH of the resultant solution to above about 1 but below about 8 below and contacting the treated material with an aqueous solution of ammonia to cure th methylol phosphorus compound in and on the cellulosic containing material.

2. The process of claim 1 wherein the tetrakis(hydroxymethyl)-phosphonium acid salt is the chloride.

3. The process of claim 2 wherein the methylolphosphorus compound is the product of the reaction of about one mol proportion of tetrakis-(hydroxymethyl)-phosphonium chloride with about one mol proportion of ammonia, in the presence of at least about 0.25 mol proportion of a carbamic acid derivative.

4. The process of claim 3 wherein the treated material is dried to about 50 percent or less moisture retention without substantial fixation of the reaction product on the fiber.

5. The process of claim 1 wherein the carbamic acid derivative is urea or thiourea.

6. The process of claim 5 wherein the carbamic acid derivative is urea and is present in the amount of from about 0.5 to about 2 mol proportion per mol proportion of the tetrakis(hydrox methyl)phosphonium acid salt.

7. The process of claim 5 wherein the reaction product is formed by reacting one mol proportion of tetrakis(hydroxymethyl) phosphonium chloride with about 0.8 mol proportion of ammonia and about 0.5 mol proportion of urea.

8. Fire retardant cellulosic containing material obtained by treating cellulosic containing material with an aqueous solution of the reaction product of a tetrakis(-hydroxymethyl)phosphonium acid salt with from about 0.5 to about 1.5 mol proportion of ammonia in said aqueous solution and at least about 0.25 mol proportion of a carbamic acid derivative selected from the group consisting of urea, thiourea, biuret, guanidine, cyanamide, dicyanamide, and ethyleneurea, said aqueous solution having a pH of above about 1 but below about 8 and treating the material with an aqueous solution of ammonia to cure said phosphonium acid salt in and on the cellulose containing material.

9. The material as claimed in claim 8 wherein the treated material is dried to a moisture retention of about 50 percent by weight or less before treating the material with aqueous ammonia.

10. The material as claimed in claim 8 wherein the reaction product is the product of the reaction of a tetrakis(hydroxymethyl)-phosphonium acid salt with about one mol proportion of ammonium and about 0.5 mol proportion of urea.

11. The material as claimed in claim 10 wherein the tetrakis-(hydroxymethyl)phosphonium acid salt is the chloride.

* * * * *

PO-1050
(5/69)

UNITED STATES PATENT OFFICE
CERTIFICATE OF CORRECTION

Patent No. 3,784,356      Dated      January 8, 1974

Inventor(s) George M. Wagner

It is certified that error appears in the above-identified patent and that said Letters Patent are hereby corrected as shown below:

Column 1 line 54 "very low" should read ---very slow---.
Column 5 line 39, "materials was" should read ---material was---; line 67 "Sample " should read ---Samples---.
Column 8 line 28, "8 below" should read ---8---; line 30 "cure th" should read ---cure the---.

Signed and sealed this 11th day of June 1974.

(SEAL)
Attest:

EDWARD M. FLETCHER, JR.
Attesting Officer

C. MARSHALL DANN
Commissioner of Patents